United States Patent
Shoji

(10) Patent No.: US 6,924,017 B2
(45) Date of Patent: Aug. 2, 2005

(54) ULTRAVIOLET-CURABLE COMPOSITION AND OPTICAL RECORDING

(75) Inventor: Toshihiro Shoji, Minaminagareyama (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/768,178

(22) Filed: Jan. 24, 2001

(65) Prior Publication Data

US 2001/0017819 A1 Aug. 30, 2001

(30) Foreign Application Priority Data

Jan. 28, 2000 (JP) ..................... P2000-020056

(51) Int. Cl.$^7$ ............... B32B 3/02; H04B 1/20; G11B 25/00
(52) U.S. Cl. ............. 428/64.1; 428/64.2; 428/64.4; 369/1; 369/272
(58) Field of Search ............... 428/64.1, 64.2, 428/64.4; 369/1, 272.1

(56) References Cited

U.S. PATENT DOCUMENTS 4,127,460 A * 11/1978 Gaske et al. ........... 204/159.13

5,573,831 A * 11/1996 Suzuki et al. ............. 428/64.1

FOREIGN PATENT DOCUMENTS

| EP | 1 058 250 A1 | 12/2000 |
| JP | 7-192315 | 7/1995 |
| WO | WO 99/34361 | 7/1999 |
| WO | WO 00/09620 | 2/2000 |

* cited by examiner

*Primary Examiner*—Rena Dye
*Assistant Examiner*—Lawrence Ferguson
(74) *Attorney, Agent, or Firm*—Armstrong, Kratz, Quintos, Hanson & Brooks, LLP

(57) ABSTRACT

The present invention provides an ultraviolet-curable composition having satisfactory protective performance even in endurance testing at high temperature and high humidity in an optical recording medium having for its reflective film Ag or a metal and/or alloy having Ag for its main component, and an optical recording medium in which it is applied. A cured film of an ultraviolet-curable composition, for which the pH value of a 1 wt % methanol solution of said ultraviolet-curable composition is within the range of 4.5 to 6.8, is coated onto a reflective film in the form of a protective film.

19 Claims, 1 Drawing Sheet

ULTRAVIOLET-CURABLE COMPOSITION AND OPTICAL RECORDING

BACKGROUND OF THE INVENTION

1. Field of the Invention

The present invention relates to an optical recording medium and an ultraviolet-curable composition used for forming a protective film of that medium, and more particularly, to an optical recording medium, in which the reflecting film is Ag or a metal and/or alloy having Ag for its main component, and an ultraviolet-curable composition used as its protective film.

2. Description of Related Art

Write-once, rewritable and various other types of optical recording media, and particularly optical recording discs, have attracted attention in recent years as large-capacity data recording media. In particular, optical recording disc, which has a recording layer having a dye for its main component, can be produced at low cost since the recording layer is able to be formed by coating. These optical recording discs have been observed to demonstrate increasing popularity throughout the world.

Although optical recording discs employing a so-called air sandwich structure, in which an air layer is provided on the recording layer, have been used as optical recording discs in the past, more recently, optical recording discs have been developed that are capable of reading in accommodation of compact disc (CD) standards by providing a reflective layer adhered to the surface of the recording layer. Namely, these optical recording discs are comprised of sequentially laminating a recording layer having a dye for its main component, reflective layer and protective layer in that order on a polycarbonate or other transparent substrate, providing the reflective layer adhered to the recording layer, and enabling a constitution having a total disc thickness of 1.2 mm in accommodation of CD standards. Moreover, similarly laminated optical recording discs that comply with DVD standards compatible with high density have also been proposed.

In optical recording discs of this type of layer composition, a chemically stable Au (gold) thin film has been used in the past for the reflective film in order to comply with CD reflectance standards. However, accompanying the proliferation of optical recording discs, there have been greater demands placed on reducing cost. As a result, reflective films composed of Ag or a metal and/or alloy having Ag for its main component are coming into the mainstream in order to produce less expensive discs. On the other hand, Ag thin films have the disadvantage of having poor corrosion resistance. Namely, although Ag is not oxidized even when heated to high temperatures and is a chemically stable metal in a dry atmosphere, in the presence of air containing a normal amount of moisture or in the presence of sulfide gas, Ag encounters problems in which it deteriorates, becomes discolored or loses its luster. Thus, it becomes necessary to improve protective performance of the protective film that protects it to an even greater extent than in the case of using an Au thin film for the reflective film.

In the past, techniques have been proposed for alloying Ag with various types of metals in order to improve the corrosion resistance of Ag thin films when used as reflective films. For example, the containing of Mg (magnesium) at 1–10 wt % is proposed in Japanese Unexamined Patent Application, First Publication No. 7-3363. However, although these techniques are observed to be slightly effective, in the case of an optical recording medium in which a protective film is formed with an ultraviolet-curable composition of the prior art, durability under conditions of high temperature and high humidity was not considered to be adequate.

On the other hand, with respect to ultraviolet-curable compositions used as protective films, the containing of a phosphate ester monomer is known to be effective in the case of a using an Al (aluminum) thin film or other metal thin film of the prior art for the reflective film (e.g., Japanese Unexamined Patent Application, First Publication No. 62-97150 and Japanese Unexamined Patent Application, First Publication No. 3-131605). However, in the case of using a cured film of an ultraviolet-curable composition based on these findings for the protective film, adequate durability of the optical recording medium under conditions of high temperature and high humidity is unable to be obtained in the same manner as previously described.

BRIEF SUMMARY OF THE INVENTION

Therefore, the object of the present invention is to provide a protective film of an ultraviolet-curable composition that improves the durability of the reflective film under conditions of high temperature and high humidity in an optical recording medium having Ag or a metal and/or alloy having Ag for its main component for its reflective film.

As a result of earnest studies, the inventor of the present invention found that an ultraviolet-curable composition containing a phosphate ester monomer conventionally considered to be effective for Al and other metals has a detrimental effect on the durability of a reflective film composed of Ag or a metal and/or alloy having Ag for its main component, and that it is preferable to use as a protective film a cured film composed of an ultraviolet-curable composition, in which the pH value of a methanol solution is within a specific range, for their reflective films, thereby leading to completion of the present invention.

Namely, the present invention provides an ultraviolet-curable composition used for the above-mentioned protective film in an optical recording medium having a recording layer or data recording pits, reflective film composed of Ag or a metal and/or alloy having Ag for its main component, and a protective film comprised of a cured film of an ultraviolet-curable composition on a substrate in that order, the pH value of a 1 wt % methanol solution being 4.5–6.8, as well as an optical recording medium having that cured film as a protective film.

Here, in the ultraviolet-curable composition, the containing of a monomer and/or oligomer having a carboxyl group is preferable in terms of controlling the pH value of the composition, and a monomer and/or oligomer content of 0.05–1 wt % is particularly preferable.

According to the present invention, as was previously described, in an optical recording medium having a reflective film composed of Ag or a metal and/or alloy having Ag for its main component, by using for the protective film that which is composed and blended so that the pH value of a methanol solution of the ultraviolet-curable composition is within a prescribed range, an optical recording medium is obtained that has improved durability of the reflective film under conditions of high temperature and high humidity.

DETAILED DESCRIPTION OF THE INVENTION

Figure 1:
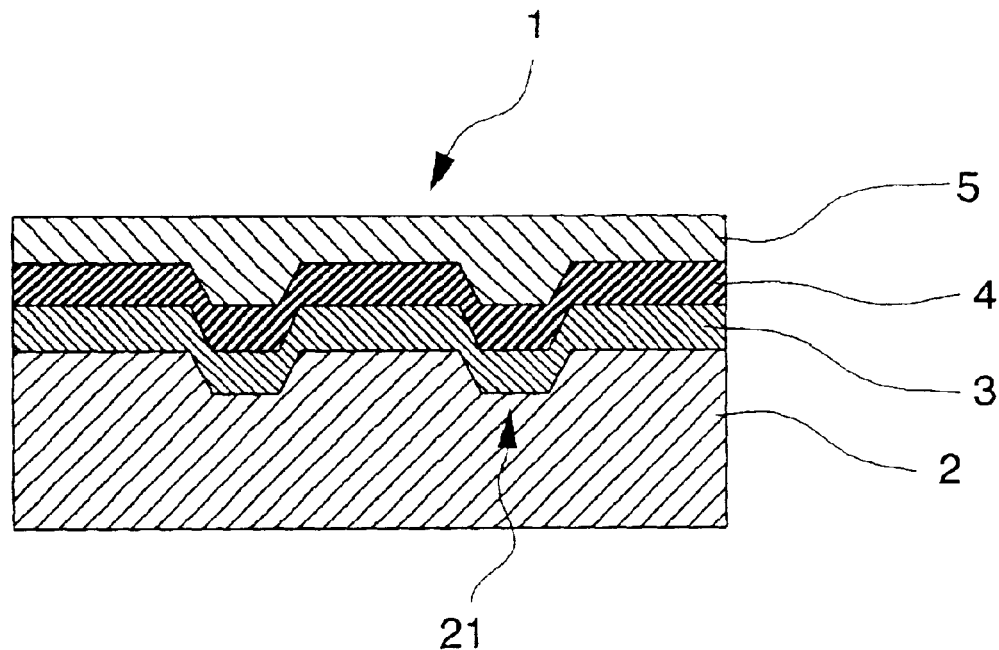
FIG. 1 is an example of a partial cross-sectional view of an optical recording disc according to the present invention.

The following provides a detailed explanation of the present invention with reference to the drawings. An explanation is provided of an optical recording disc having the layer composition as shown in FIG. 1 as an optical recording medium, and a production method of this optical recording disc. FIG. 1 shows an example of a partial cross-sectional view of an optical recording disc. Optical recording disc 1 has recording layer 3 of the coated type and having a dye for its main component on substrate 2, reflective layer 4 adhered to recording layer 3, and protective film 5 on reflective layer 4.

Substrate 2 is formed from substantially transparent (preferably having transmittance of 88% or more) plastic or glass relative to recording light and reading light (wavelength of about 600–900 nm). As a result, recording and reading are possible from the bottom side of the substrate. Plastic is preferably used for the substrate material, and typically polycarbonate resin is widely used.

Substrate 2 has the shape of a normal size disc, and in the case of using as a recordable CD, the thickness is about 1.2 mm and the diameter is about 80–120 mm. This type of substrate 2 is produced in accordance with known methods such as injection molding. In addition, at that time a prescribed pattern such as groove 21 is formed on the surface of the substrate for tracking or for addressing. Furthermore, a resin layer having a prescribed pattern of grooves and so forth may also be formed by the 2P method and so forth following production of substrate 2.

Recording layer 3 having an organic dye for its main component is formed on this substrate 2. Examples of light-absorbing organic dyes used for recording layer 3 include cyanine, phthalocyanine, naphthalocyanine, anthraquinone, azo, triphenylmethane, pyrylium or thiapyrylium salts, squarylium, cloconium, formazane and metal complex dyes.

In addition, singlet oxygen quencher is also mixed into the light-absorbing dye. Moreover, an ion complex comprising dye cation and singlet oxygen quencher anion may also be used as light-absorbing dye.

Preferable examples of quenchers include metal complexes such as acetylacetonates, bisdithio-α-diketones, bisphenyldithiols and other bisdithiols, thiocatechols, salicylaldehydooximes and thiobisphenolates. In addition, amine compounds having a radical cation of nitrogen or amines such as hindered amines are also preferable quenchers.

The dye used in the recording layer is selected from the above light-absorbing dyes, dye-quencher mixtures and dye-quencher complexes.

Formation of recording layer 3 is performed by spin coating. Namely, a coating liquid containing dye and organic solvent is spread and coated onto rotating substrate 2 to form recording layer 3. Although the organic solvent used in the coating liquid for forming the recording layer is suitably selected according to the dye used from such organic solvents as alcohol, ketone, ester, ether, aromatic and alkyl halide solvents, organic solvents having two or more functional groups in a single molecule are preferable. Following spin coating, the coated film is dried as necessary. Although the thickness of the recording layer formed in this manner is suitably set according to the target reflectance, it is normally about 100–300 nm.

Continuing, reflective layer 4 is formed by adhering directly onto recording layer 3. Although stability under conditions of high temperature and high humidity is increased if Au is used for the reflective layer, cost ends up increasing. Thus, optical recording disc having a reflective layer composed of Ag or a metal and/or alloy having Ag for its main component has come into the mainstream in order to satisfy reflectance compatible with CD standards. This reflective layer 4 is formed by sputtering, vapor deposition or various other vapor phase deposition methods.

Next, by spin-coating an ultraviolet-curable composition on reflective layer 4 followed by irradiating with ultraviolet rays, the ultraviolet-curable composition is cured to form protective layer 5. A medium-pressure mercury lamp, metal halide lamp and so forth are used for the ultraviolet light source. This thickness of protective layer 5 is normally about 4–15 μm. If protective layer 5 is too thin, defective curing occurs due to oxygen inhibition of the ultraviolet-curable composition, which tends to make the corrosion resistance effects of the reflective layer and recording layer inadequate. On the other hand, if protective layer 5 is too thick, cracks may form due to contraction during curing, or the disc may become susceptible to the occurrence of warping. Moreover, a label printing layer is typically provided on this protective layer 5.

Although the above has described a production process of a write-once optical recording disc CD-R, it goes without saying that the present invention can also be applied to, for example, a CD, CD-ROM or other read-only optical recording disc having a reflective layer, composed of Ag or a metal and/or alloy having Ag for its main component, on a substrate having data recording pits.

An ultraviolet-curable composition used for the protective film of an optical recording medium is normally composed of (A) oligomer component, (B) monomer component, (C) photopolymerization initiator component, and (D) other components. The ratios at which (A) and (B) are used is determined by the desired physical properties of the cured composition.

It is important to select a raw material composition for the ultraviolet-curable composition of the present invention so that the pH value of a methanol solution of the composition is within a prescribed range. Basically, the containing of strongly acidic oligomers, monomers and/or photopolymerization initiators and so forth that cause the pH to decrease, and conversely, the containing of strongly basic oligomers, monomers and/or photopolymerization initiators and so forth that cause the pH to increase must be avoided. However, oligomers, monomers and photopolymerization initiators having a carboxyl group may be used since they present no problems in terms of maintaining the pH value of a methanol solution of the composition within the prescribed range, and such oligomers, monomers and photopolymerization initiators can yield favorable results depending on their contents.

The following provides a more detailed explanation of this.

Examples of component (A) include epoxy acrylate, polyurethane acrylate, polyester acrylate and polyether acrylate.

A specific example of an epoxy acrylate having a carboxyl group in its molecule is that in which a normal residual secondary hydroxyl group is esterified with acid anhydride. Examples of commercially available products of such epoxy acrylates include EX-C101, EX-C106, EX-C300 and EX-C501 manufactured by Kyoeisha Chemical Co., Ltd. In addition, examples of urethane acrylates having a carboxyl group in their molecules include polyurethane acrylate synthesized by using a polyol having a carboxyl group in its molecule, such as PLACCEL 205BA manufactured by Daicel Chemical Industries, Ltd., as the polyol component.

Component (B) can contain a component that increases the cured film strength of the composition (to be referred to as component B1) and a diluting component that lowers the viscosity of the composition (to be referred to as component B2). Component B1 preferably has two or more (meth)acryloyl groups in its molecule, and that having three or more (meth)acryloyl groups is particularly preferable Examples of compounds having two or more (meth)acryloyl groups in their molecules include dicyclopentanyl di(meth) acrylate and ethylene oxide (EO), propylene oxide and other alkylene oxide modified bisphenol A (meth)acrylates.

Examples of compounds having three or more (meth) acryloyl groups in their molecules include trimethylolpropane tri(meth) acrylate, ethylene oxide (EO), propylene oxide and other alkylene oxide modified trimethylolpropane tri(meth)acrylates, dipentaerythritol hexa(meth)acrylate, dipentaerythritol monohydroxypenta(meth)acrylate, alkyl modified dipentaerythritol penta(meth)acrylate, alkyl modified dipentaerythritol tetra(meth)acrylate, pentaerythritol tri (meth)acrylate, pentaerythritol tetra(meth)acrylate, tris [(meth)acryloxyethyl] isocyanurate, caprolactone modified tris[(meth)acryloxyethyl] isocyanurate and ditrimethylolpropane tetra(meth)acrylate.

In addition, component B2 preferably has two or less (meth)acryloyl groups in its molecule. Examples of compounds having two (meth)acryloyl groups in their molecules include tripropyleneglycol di(meth)acrylate, 1,6-hexanediol di(meth)acrylate, neopentylglycol di(meth)acrylate and diethyleneglycol di(meth)acrylate. Examples of compounds having a single (meth)acryloyl group in their molecules include 2-(2-ethoxyethoxy)ethyl (meth)acrylate, tetrahydrofurfuryl (meth)acrylate, 2-hydroxy(meth)acrylate, isobornyl (meth)acrylate, cyclohexyl (meth)acrylate and dicyclopentanyl (meth)acrylate. Furthermore, the containing of basic monomers such as N,N-diethylaminoethyl (meth)acrylate, acrylmorpholine and other aminoacrylates, or N-isopropylacrylamide, N,N-dimethylacrylamide, N,N-dimethylaminopropylacrylamide and other aminoacrylamides is not very preferable from the viewpoint of the above pH value of a methanol solution of the ultraviolet-curable composition.

Examples of monomers having a carboxyl group in their molecules include (meth)acrylic acid, (meth)acrylic dimer acid, 2-(meth)acryloyloxyethylphthalic acid, 2-(meth) acryloyloxypropylphthalic acid and 2-(meth) acryloyloxyethylsuccinic acid. Examples of commercially available products include ARONIX M-5300, M-5400 and M-5600 manufactured by Toagosei Co., Ltd., Light Acrylate HOA-MS and HOA-MPL manufactured by Kyoeisha Chemical Co., Ltd., and 98% acrylic acid, VISCOAT #2000 and VISCOAT #2100 manufactured by Osaka Organic Chemical Industry Ltd. ARONIX M-5600 (acrylic dimer acid) is particularly preferable.

Various types of photopolymerization initiators and photopolymerization sensitizers typically used in ultraviolet-curable resins can be used for component (C). Examples of cleaving photopolymerization initiators include benzoin, benzoin methyl ether, benzoin ethyl ether, benzoin isobutyl ether, 2-methylbenzoin, benzyl dimethyl ketal, 1-(4-isopropylphenyl)-2-hydroxy-2-methylpropan-1-one, 1-(4-dodecylphenyl)-2-hydroxy-2-methylpropan-1-one, 1-hydroxycyclohexyl phenyl ketone, 2-hydroxy-2-methyl-1-phenylpropan-1-one, methylphenyl glyoxylate, and 2,4,6-trimethylbenzoyldiphenylphosphine oxide. Caution is required when using basic photopolymerization initiators such as 2-methyl-1-[4-(methylthio)phenyl]-2-morpholinopropane-1 and 2-benzyl-2-dimethylamino-1-(4-morpholinophenyl)-butanone-1 since they cause an increase in the pH value of a methanol solution of the composition depending on their content. In addition, examples of combinations of hydrogen-abstraction photopolymerization initiators include benzophenone-based sensitizers such as benzophenone, methyl benzoylbenzoate and acrylic benzophenone, aliphatic amines such as triethylamine, methyldiethanol amine and triethanol amine, HALS (hindered amines) such as bis(N-methyl-2,2,6,6-tetramethyl-4-piperidinyl) sebacate and phenyl 4-piperidinylcarbonate, and aromatic amines such as p-dimethylaminoacetophenone, ethyl p-dimethylaminobenzoate and isoamyl p-dimethylaminobenzoate. Namely, these are combinations of benzophenone-based compounds and basic compounds, and these combinations are not very preferable since basic substances increase the pH value of a methanol solution of the composition.

Since the combinations and amounts added of the above photopolymerization initiators and photopolymerization sensitizers influence the pH value of a methanol solution of the ultraviolet-curable composition used for the protective film of an optical recording medium, it is important to determine the combinations and amounts added of photopolymerization initiators after ensuring that the curing rate reaches a practical level. From this viewpoint, if selecting a photopolymerization initiator, the use of an initiator such as benzoylbenzoic acid, 1-hydroxycyclohexyl phenyl ketone, 2-hydroxy-2-methyl-1-phenylpropan-1-one, benzyl dimethyl ketal and methylphenyl glyoxylate.

Various types of additives such as polymerization inhibitors and surfactants are used as necessary for component (D). Known thermal polymerization inhibitors such as hydroquinone monomethyl ether, t-butylcatechol, p-benzoquinone, 2,5-t-butylhydroquinone and phenothiazine are preferably added to the ultraviolet-curable composition to prevent thermal polymerization during production and dark reactions during storage.

Moreover, surfactant is frequently added to improve coatability. Examples of surfactants include fluorine-based nonionic surfactants such as MEGAFAK F-142D, MEGAFAK F-144D, MEGAFAK F-150, MEGAFAK F-171, MEGAFAK F-173, MEGAFAK F-177 and MEGAFAK F-183 manufactured by Dainippon Ink and Chemicals, Inc.

The proportions of components A, B1 and B2 used in the ultraviolet-curable protective film composition are determined based on the desired coated film strength. As the proportion of component B2 increases, the viscosity of the ultraviolet-curable composition decreases while coated film strength tends to become weak.

The proportions of components A and B1 used is preferably 50 wt % or more as the proportion of the combined amount of components A and B1 used in terms of coated film strength, and a combined proportion of 90 wt % or less is preferable in terms of composition viscosity. In addition, the proportion of component B2 used is preferably 5 wt % or more in terms of diluting effects, and a proportion of 40 wt % or less is preferable in terms of coated film strength.

EXAMPLES

Although the following provides a more detailed explanation of the present invention through its examples, the present invention is not limited by these examples.

(Measurement of pH Value of Methanol Solution of Ultraviolet-Curable Composition)

1 wt % methanol solutions were prepared of each ultraviolet-curable composition. Here, reagent grade 1 methanol was used for the methanol. Next, the pH values of the methanol solutions were measured at a liquid temperature of 25±2° C. using the COM-8 pH meter and Type 6155 pH composite electrode manufactured by Denki Kagaku Keiki Co., Ltd.

Examples 1–4 and Comparative Examples 1 and 2

A write-once type compact disc (CD-R) was fabricated having the constitution shown in FIG. 1. To begin with, recording layer 3 containing dye and having a thickness of 200 nm was formed on polycarbonate resin substrate 2 having spiral-shaped continuous groove 21, diameter of 120 mm and thickness of 1.2 mm. A coating solution containing 5 parts by weight of a mixture of the cyanine-based dye C (80 wt %) and singlet oxygen quencher Q (20 wt %) indicated below dissolved in 95 parts by weight of diacetone alcohol was coated by spin coating to form recording layer 3.

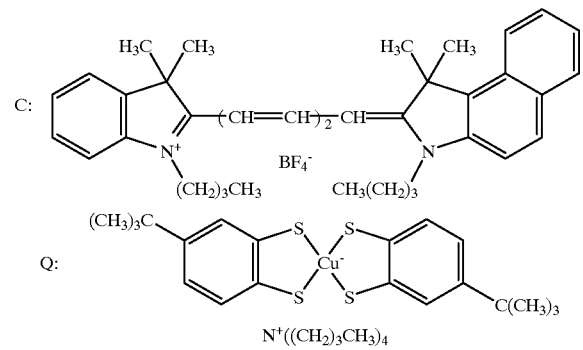

Next, Ag (silver) reflective layer 4 was formed on recording layer 3 by sputtering. The thickness of the reflective layer was made to be 80 nm. The ultraviolet-curable composition of Table 1 was coated onto reflective layer 4 by spin coating to an average thickness of 7 μm, and cured by irradiating with ultraviolet rays using a 120 W/cm medium-pressure mercury lamp (H03-L31 manufactured by Eye Graphics Co., Ltd.) at 250 mJ/cm$^2$ (as determined with the UVPF-36 UV light meter manufactured by Eye Graphics Co., Ltd.) to form protective layer 5. Samples of write-once compact discs were obtained in this manner.

Continuing, sample discs were fabricated with the CDRW-S4224 CD-RW Drive manufactured by Melco Inc. containing ROM data written onto the write-once sample discs obtained above.

Comparative Examples 3–8

Figure 2:
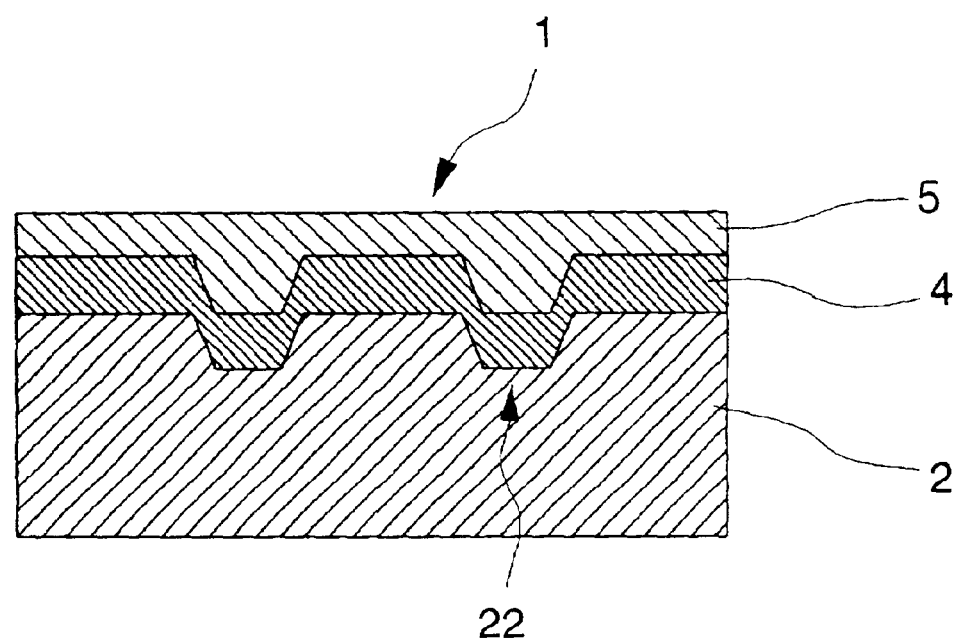
FIG. 2 is an example of a partial cross-sectional view of an optical recording disc according to the present invention.

A read-only type compact disc (CD-ROM) was fabricated having the constitution shown in FIG. 2. To begin with, Al (aluminum) reflective layer 4 was formed by sputtering on polycarbonate resin substrate 2 having rows of pits (22) at a pitch of 1.6 μm, diameter of 120 mm and thickness of 1.2 mm. The thickness of the reflective layer was made to be 75 nm. Next, the ultraviolet-curable composition of Table 2 was coated by spin coating onto reflective layer 4 to an average thickness of 7 μm, followed by curing under the same conditions as the examples to form protective layer 5 and fabricate sample disc.

(Measurement of BLER)

Endurance test for 100 hours at (1) 80° C. and 80% RH was performed on each of the sample discs obtained in the manner described above, and the block error rates (BLER) were measured before and after test.

Measurement was performed at the inner circumference of each disc for 15 minutes to determine the average number of C1 errors per second (counts/sec). Furthermore, CD and CD-R standards require BLER to be equal to or less than 220 counts/sec.

The results of the above test are shown in Tables 1 and 2.

TABLE 1

|  |  |  | Ex. 1 | Ex. 2 | Ex. 3 | Ex. 4 | Comp. Ex. 1 | Comp. Ex. 2 |
|---|---|---|---|---|---|---|---|---|
| Composition (parts by wt.) | A + B1 | BF-TMP | 35 | 35 | 35 | 35 | 35 | 35 |
|  |  | ETA0 300 | 30 | 30 | 30 | 30 | 30 | 30 |
|  | B2 | APG-200S | 26 | 26 | 26 | 26 | 26 | 26 |
|  | C | BP | 3 | 3 | 3 | 3 | 3 | 3 |
|  |  | Irg. 184 | 6 | 6 | 6 | 6 | 6 | 6 |
|  | D | F-173 | 0.2 | 0.2 | 0.2 | 0.2 | 0.2 | 0.2 |
|  |  | M-5600 | — | 0.5 | 0.1 | — | — | — |
|  |  | HOA-MEL | — | — | — | 0.5 | — | — |
|  |  | PM-2 | — | — | — | — | 0.5 | — |
|  |  | DMB | — | — | — | — | — | 0.5 |
| Evaluation Results | pH value of 1% methanol solution | | 6.4 | 5.4 | 6.0 | 4.8 | 2.3 | 7.6 |
|  | Reflective film material | | Ag | Ag | Ag | Ag | Ag | Ag |
|  | C1 error (count/sec) | Before endurance test | 2.0 | 1.5 | 1.4 | 1.8 | 2.5 | 1.8 |
|  |  | After endurance test | 10.0 | 7.0 | 6.0 | 12.5 | 240.0 | 45.0 |

TABLE 2

|  |  |  | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Composition (parts by wt.) | A + B1 | BF-TMP | 35 | 35 | 35 | 35 | 35 | 35 |
|  |  | ETA-300 | 30 | 30 | 30 | 30 | 30 | 30 |
|  | B2 | APG-200S | 26 | 26 | 26 | 26 | 26 | 26 |
|  | C | BP | 3 | 3 | 3 | 3 | 3 | 3 |
|  |  | Irg. 184 | 6 | 6 | 6 | 6 | 6 | 6 |
|  | D | F-173 | 0.2 | 0.2 | 0.2 | 0.2 | 0.2 | 0.2 |
|  |  | M-5600 | — | 0.5 | 0.1 | — | — | — |
|  |  | HOA-MPL | — | — | — | 0.5 | — | — |
|  |  | PM-2 | — | — | — | — | 0.5 | — |
|  |  | DMB | — | — | — | — | — | 0.5 |
| Evaluation Results | pH value of 1% methanal solution | | 6.4 | 5.4 | 6.0 | 4.8 | 2.3 | 7.6 |
|  | Reflective film material | | Al | Al | Al | Al | Al | Al |
|  | C1 error (count/sec) | Before endurance test | 1.5 | 1.4 | 1.5 | 1.4 | 1.3 | 1.4 |
|  |  | After endurance test | Immeasurable | 8.0 | 5.0 | 10.0 | 1.4 | Immeasurable |

Here, the abbreviations for the raw materials used in the ultraviolet-curable compositions of the above Tables 1 and 2 respectively indicate the substances listed below.

BF-TMP: Trimethylolpropane triacrylate
ETA-300: EO modified trimethylolpropane triacrylate
APG-200: Tripropyleneglycol diacrylate
BP: Benzophenone
Irg.184: 1-hydroxycyclohexyl phenyl ketone
F-173: Nonionic fluorine-based surfactant manufactured by Dainippon Ink and Chemicals, Inc.
M-5600: Acrylic dimer acid
HOA-MPL: 2-acryloyloxyethylphthalic acid
PM-2: EO modified phosphoric acid dimethacrylate
DMB: 2-dimethylaminoethylbenzoic acid According to Table 1, the sample discs of the examples exhibited little change in measured values of C1 error even after endurance test, and clearly possessed an adequate level of practical performance. On the other hand, the sample discs of the comparative examples that used an Ag reflective film exhibited a greater degree of worsening of C1 error after endurance test, and were determined to have lost their function as recording media. In addition, in the case of the sample discs of Table 2 that used an Al reflective film shown for the sake of comparison, there was no well-defined correlation observed between pH values and characteristics, clearly demonstrating that the effect of the present invention resulting from controlling pH is an effect that is unique to the case of using an Ag reflective film.

What is claimed is:

1. An ultraviolet-curable composition used for a protective film in an optical recording medium, said ultraviolet curable composition comprising:
 a polymerizable composition comprising at least one of a monomer and an oligomer having a carboxyl group, present in an amount sufficient such that a pH of a 1.0 wt % methanol solution of said polymerizable composition is within the range of 4.5 to 6.8, and
 said optical recording medium, comprising:
  (a) a recording layer or data recording pits, and
  (b) a reflective film comprising Ag or an alloy having Ag as its main component
  provided on said recording layer,
 wherein said polymerizable composition is provided on said reflective film to form said protective film upon curing.

2. The ultraviolet-curable composition of claim 1, said polymerizable composition consists essentially of a solution of said polymerizable composition.

3. An ultraviolet-curable composition used for a protective film in an optical recording medium, said ultraviolet-curable composition comprising:
 at least one of a monomer and an oligomer having a carboxyl group, present in an amount sufficient such that a pH of a 1.0 wt.% methanol solution of said ultraviolet-curable composition is within the range of 4.5 to 6.8, and
 said optical recording medium comprising:
 (a) a recording layer or data recording pits,
 (b) a reflective film comprising Ag or an alloy having Ag as its main component, and
 (c) a protective film comprising a cured film of said ultraviolet-curable composition, deposited in that order, on a substrate.

4. The ultraviolet-curable composition according to any one of claim 1 or 3, wherein said at least one of a monomer and an oligomer having a carboxyl group, is present at a concentration within the range of 0.05 to 1 wt %.

5. The ultraviolet-curable composition of claim 3, said ultraviolet-curable composition consists essentially of a solution of said ultraviolet-curable composition.

6. The ultraviolet-curable composition of claim 4, further comprising a second monomer comprising one or more members selected from the group consisting of: a third monomer having 2 or more (meth)acryloyl groups in its molecule which increases the strength of a cured film of the composition, and a fourth monomer having 2 or less (meth) acryloyl groups in its molecule which lowers the viscosity of the composition.

7. The ultraviolet-curable composition of claim 6, said third monomer comprises 3 or more (meth)acryloyl groups in its molecule.

8. The ultraviolet-curable composition of claim 6, further comprising a second oligomer comprising one or more members selected from the group consisting of: epoxy acrylate, polyurethane acrylate, polyester acrylate and polyether acrylate.

9. The ultraviolet-curable composition of claim 4, further comprising one or more members selected from the group consisting of: a photopolymerization initiator, a photopolymerization sensitizer, a polymerization inhibitor, and a surfactant.

10. The ultraviolet-curable composition of claim 8, wherein said oligomer having a carboxyl group, said second oligomer and said third monomer are present in a combined amount of from 50 wt % to 90 wt %, and said fourth monomer is present in an amount of from 5 wt % to 40 wt %.

11. The ultraviolet-curable composition of claim 4, said oligomer comprising one or more members selected from the group consisting of: an epoxy acrylate having a carboxyl group in its molecule, a polyurethane acrylate having a carboxyl group in its molecule, a polyester acrylate having a carboxyl group in its molecule, and a polyether acrylate having a carboxyl group in its molecule.

12. The ultraviolet-curable composition of claim 4, said monomer comprising one or more members selected from the group consisting of(meth)acrylic acid, (meth)acrylic dimer acid, 2-(meth)acryloyloxyethylphthalic acid, 2-(meth)acryloyloxy propylphthalic acid, and 2-(meth)acryloyloxyethylsuccinic acid.

13. An optical recording medium, comprising: a protective film comprising a cured film of an ultraviolet-curable composition, said ultraviolet-curable composition comprising at least one of a monomer and an oligomer having a carboxyl group, present in an amount sufficient such that a pH of a 1.0 wt % methanol solution of said ultraviolet-curable composition is within the range of 4:5 to 6.8.

14. An optical recording medium, comprising: a protective film comprising a cured film of an ultraviolet-curable composition, said ultraviolet-curable composition comprising a polymerizable composition capable of being cured using ultraviolet radiation and composed such that a pH of a 1wt % methanol solution of said polymerizable composition is within the range of 4.5 to 6.8.

15. The optical recording medium of any one of claim 13 or 14, further comprising:
a recording layer or data recording pits, provided on a substrate, and
a reflective film comprising Ag or an alloy having Ag as its main component, provided on said recording layer, and
wherein said protective film is provided on and is in communication with, said reflective film, to form said optical recording medium.

16. The optical recording medium, according to any one of claim 13 or 14, said ultraviolet-curable composition consists essentially of a solution comprising at least one of a monomer and an oligomer having a carboxyl group, present in an amount sufficient such that a pH of a 1.0 wt % methanol solution of said ultraviolet-curable composition, is within the range of 4.5 to 6.8.

17. The optical recording medium of claim 15, further comprising a label printing layer, provided on said protective film.

18. The optical recording medium of any one of claim 13 or 15, said protective film has a thickness in the range of from 4 to 15 $\mu$m.

19. An optical recording medium, comprising:
a substrate;
a recording layer or data recording pits provided on said substrate;
a reflective film comprising Ag, or an alloy of Ag having Ag as its main component, said reflective film provided on said recording layer; and
a protective film comprising a cured film of an ultraviolet-curable composition provided on said reflective film, to produce said optical recording medium,
wherein said ultraviolet-curable composition is composed such that a pH of a 1.0 wt % methanol solution of said ultraviolet-curable composition is within the range of 4.5 to 6.8.

* * * * *